United States Patent [19]

Gaggar

[11] Patent Number: 5,128,409
[45] Date of Patent: Jul. 7, 1992

[54] POLYCARBONATE/GRAFT ABS BLENDS WITH IMPROVED WELD LINE STRENGTH

[75] Inventor: Satish K. Gaggar, Parkersburg, W. Va.

[73] Assignee: General Electric Company, N.Y.

[21] Appl. No.: 596,921

[22] Filed: Oct. 15, 1990

Related U.S. Application Data

[63] Continuation-in-part of Ser. No. 369,157, Jun. 21, 1989, abandoned.

[51] Int. Cl.$^5$ .................... C08L 69/00; C08L 55/02; C08L 33/12
[52] U.S. Cl. ..................... 525/67; 525/133; 525/148
[58] Field of Search .................... 525/67, 133, 148

[56] References Cited

U.S. PATENT DOCUMENTS

| | | | |
|---|---|---|---|
| 3,130,177 | 4/1964 | Gabowski | 525/67 |
| 3,954,905 | 5/1976 | Margotte et al. | 525/67 |
| 3,988,389 | 10/1976 | Margotte et al. | 525/67 |
| 4,390,657 | 6/1983 | Liu | 525/67 |
| 4,444,949 | 4/1984 | Liu | 525/67 |
| 4,461,868 | 7/1984 | Lindner et al. | 525/67 |
| 4,503,183 | 3/1985 | Liu | 525/67 |
| 4,663,389 | 5/1987 | Jones et al. | 525/67 |
| 4,764,555 | 8/1988 | Shigemitsu et al. | 525/67 |

FOREIGN PATENT DOCUMENTS

| | | | |
|---|---|---|---|
| 49-132143 | 12/1974 | Japan | 525/67 |
| 63-221155 | 9/1988 | Japan | 525/67 |
| 1182807 | 3/1970 | United Kingdom . | |

OTHER PUBLICATIONS

Hagerman, *Plastics Engineering*, Oct. 1973, pp. 67-69.

*Primary Examiner*—James J. Seidleck
*Assistant Examiner*—David Buttner
*Attorney, Agent, or Firm*—Lowe, Price, LeBlanc & Becker

[57] ABSTRACT

A thermoplastic polymer blend molding composition comprises A) an ABS graft copolymer component; B) a polycarbonate component and C) a weld-line strength enhancing amount of a polyalkylmethacrylate, preferably polymethylmethacrylate.

7 Claims, No Drawings

POLYCARBONATE/GRAFT ABS BLENDS WITH IMPROVED WELD LINE STRENGTH

RELATED APPLICATION

This application is a continuation-in-part of copending application Ser. No. 07/369,157 filed Jun. 21, 1989 now abandoned.

FIELD OF THE INVENTION

The present invention relates to thermoplastic compositions comprising a blend of polycarbonate and a graft acrylonitrile-butadiene-styrene (ABS) resin, and further containing a poly (alkyl methacrylate) as a weld line strength enhancer.

BACKGROUND OF THE INVENTION

There are many references in the prior art to blends of polycarbonate and ABS, the first significant patent reference in this field being the Grabowski U.S. Pat. No. 3,130,177. As improvements on the original Grabowski patent were developed, attention was focussed on the weld line strength problem which characterized certain of these blends. In the Margotte et al U.S. Pat. No. 3,988,389, the weld line strength of a polycarbonate/ABS blend is said to be improved by using a very specific graft ABS formulation having a narrowly defined graft ratio, rubber particle size, rubber content, and the like.

Insofar as the use of poly (alkyl methacrylates) in rubber modified polycarbonates is concerned, British Patent 1,182,807 describes a blend of a thermoplastic aryl polycarbonate and a poly(methylmethacrylate) which may optionally include a minor proportion of a "rubbery polymeric material." Examples of the latter include SBR and nitrile rubbers as well as graft polymers, primarily rubbery acrylate copolymers. Graft ABS, and more particularly, high rubber graft/styrene-acrylonitrile (SAN) blends are not mentioned or suggested.

It should also be pointed out that poly (alkyl methacrylates) have been used as process aids for many polymers, including ABS/polycarbonate blends. Such process aids are used in very small quantities, less than 5% and are generally very high molecular weight products, generally having weight average molecular weights, MW, higher than 500,000, as compared to the weight average molecular weights of about 200,000 exhibited by the poly(alkyl methacrylates) included in the compositions of the present invention.

SUMMARY OF THE INVENTION

In the molding of parts from thermoplastic materials, it is quite common to use a mold design in which molten plastic flowing in one direction meets molten plastic flowing from another direction as the mold fills. Where the two masses meet, the streams fuse together and form a bond at the juncture. The zone where the materials join is often referred to in the industry as the weld line or knit line.

The tensile strength of a molded part at the weld line is usually lower than in other sections of the part. This problem is exacerbated when the part is complex, such as those processed in a mold in which several weld lines are formed in the same part. Reduced weld line strength imposes severe limitations on the design of parts. In many cases the dimensions of the entire part are controlled by the weld line strength; and the need to have a safety factor to compensate for weakness in this area can force the designer to make parts larger than necessary or to substitute a higher performance (and more expensive) polymer than would otherwise be needed. See *Plastics Engineering*, October 1973, pp. 67–69.

In the present invention, it has been discovered that the use of up to about 20% by weight of a poly (alkyl methacrylate), preferably poly (methyl methacrylate) homopolymers and copolymers, has a dramatic effect on the weld line strength of blends of polycarbonate, such as bisphenol A polycarbonate, and graft polymers of acrylonitrile, butadiene and styrene, preferably those graft polymers formulated with a high rubber graft and a rigid phase comprising a styrene-acrylonitrile copolymer.

DETAILED DESCRIPTION OF THE INVENTION

As mentioned above in the summary portion of this Specification, the present invention relates generally to blends of ABS graft polymer with polycarbonate, which blends further contain up to about 20% by weight (based on the end product) of a poly (alkyl methacrylate), preferably polymethylmethacrylate (PMMA).

ABS type polymers useful in the present invention have molecules which contain two or more polymeric parts of different compositions that are bonded chemically. The polymer is preferably prepared by polymerizing a conjugated diene, such as butadiene, or a conjugated diene and a monomer copolymerizable therewith, such as styrene, to provide a polymeric backbone. After formation of the backbone, at least one grafting monomer, and preferably two grafting monomers, are polymerized in the presence of the prepolymerized backbone to obtain the graft polymer. These resins are prepared by methods well known in the art.

The backbone polymer, as mentioned, is preferably a conjugated diene polymer such as polybutadiene, polyisoprene, or a copolymer, such as butadienestyrene, butadiene-acrylonitrile, or the like.

The specific conjugated diene monomers normally utilized in preparing the backbone of the graft polymer are generically described by the following formula:

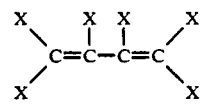

wherein X is selected from the group consisting of hydrogen, alkyl groups containing from one to five carbon atoms, chlorine or bromine. Examples of dienes that may be used are butadiene, isoprene, 1,3-heptadiene, methyl-1,3-pentadiene, 2,3-dimethyl-1,3-butadiene, 2-ethyl-1,3- pentadiene, 1,3- and 2,4-hexadienes, chloro and bromo substituted butadienes such as dichlorobutadiene, bromobutadiene, and dibromobutadiene, mixtures thereof, and the like. A preferred conjugated diene is butadiene.

One monomer which is polymerized in the presence of the prepolymerized backbone comprises a monovinyl-aromatic compound. The monovinylaromatic monomers utilized are generically described by the following formula:

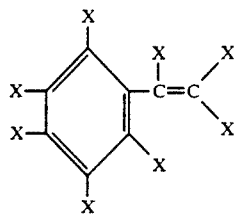

wherein X is as previously defined. Examples of the monovinylaromatic compounds and alkyl-, cycloalkyl-, aryl-, alkaryl-, aralkyl-, alkoxy-, aryloxy-, and other substituted vinylaromatic compounds include styrene, para-methylstyrene, α-methylstyrene, 3,5-diethylstyrene, 4-n-propylstyrene, α-methyl vinyltoluene, α-chlorostyrene, α-bromostyrene, dichlorostyrene, dibromostyrene, tetrachlorostyrene, mixtures thereof, and the like. The preferred monovinylaromatic compounds for use in the invention are styrene and/or α-methylstyrene.

A second monomer which is polymerized in the presence of the prepolymerized backbone comprises an acrylic monomer such as acrylonitrile, substituted acrylonitrile, and/or an acrylic acid ester, exemplified by alkyl acrylates such as ethyl acrylate and methyl methacrylate.

The acrylonitrile, substituted acrylonitrile, or acrylic acid esters are described generically by the following formula:

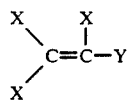

wherein X is as previously defined and Y is selected from the group consisting of cyano and carbalkoxy groups wherein the alkoxy group of the carbalkoxy contains from one to about twelve carbon atoms. Examples of the cyano-containing alkenyl nitrile monomers include acrylonitrile, ethacrylonitrile, methacrylonitrile, α-chloroarylonitrile, β-chloroacrylonitrile, α-bromoacrylonitrile, and β-bromoacrylonitrile, while examples of the acrylic acid esters include methyl acrylate, alkyl methacrylate, ethyl acrylate, butyl acrylate, propyl acrylate, isopropyl acrylate and mixtures thereof. The preferred acrylic monomer is an alkenyl nitrile, particularly acrylonitrile. In a further preferred embodiment, the grafting monomers which form the ABS resin are essentially free of methyl methacrylate, i.e., the grafting monomers containing less than about 5 weight percent methyl methacrylate.

In the preparation of the ABS graft polymer, the conjugated diolefin polymer or copolymer exemplified by a 1,3-butadiene polymer or copolymer comprises at least about 40% by weight and preferably about 50% by weight of the total ABS graft polymer composition. The monomers polymerized in the presence of the backbone, exemplified by styrene and acrylonitrile, comprise not greater than about 60% by weight of the total graft polymer composition.

The second group of grafting monomers, exemplified by acrylonitrile, preferably comprise from about 10% to about 40% by weight of the total graft copolymer composition, while the monovinylaromatic monomer exemplified by styrene comprises from about 40 to about 10% by weight of the total graft polymer composition.

In preparing the polymer, it is normal to have a certain percentage of the polymerizing monomers that are grafted on the backbone combine with each other and occur as free copolymer. For example, if styrene is utilized as one of the grafting monomers and acrylonitrile as the another grafting monomer, a certain portion of the composition will copolymerize as free styrene-acrylonitrile copolymer. In the case where α-methylstyrene (or another monomer) is substituted for the styrene in the composition used in preparing the graft polymer, a certain percentage of the composition may be an a-methyl-stryrene-acrylonitrile copolymer. Also, there are occasions where a copolymer, such as a-methylstyrene-acrylonitrile, is added to the ABS graft polymer. When an ABS graft polymer is referred to herein, it is meant optionally to include at least one free copolymer blended with the graft polymer composition and may contain up to 90% by weight of the free copolymer.

Polycarbonates are a special class of polyesters derived from the reaction of carbonic acid derivatives with aromatic, aliphatic, or mixed diols. They may be produced by the reaction of phosgene with a diol in the presence of an appropriate hydrogen chloride receptor or by a melt transesterification reaction between the diol and a carbonate ester. Polycarbonate can be made from a wide variety of starting materials, however, the principal polycarbonate produced commercially is bisphenol A polycarbonate, a polycarbonate made by reacting bisphenol A with phosgene by condensation.

For a more complete discussion of the chemistry of polycarbonates, one may refer to *The Kirk-Othmer Encyclopedia of Chemical Technology*, Third Edition (1982), Vol. 18, pp. 479–494. The article contained therein by D. W. Fox is incorporated herein by reference in its entirety.

Polymethylmethacrylate (PMMA) is produced by the polymerization of methyl methacrylate monomer, and may be derived by (1) the reaction of acetone cyanohydrin, methanol and sulphuric acid or (2) the oxidation of tert-butyl alcohol to methacrolein and then to methacrylic acid followed by the esterification reaction with methanol. PMMA homopolymer exists in its pure form only theoretically and is generally available commercially as a mixture of the homopolymer and various copolymers of methyl methacrylate and $C_1$–$C_4$ alkyl acrylates, such as ethyl acrylate.

Preferably, the compositions according to the present invention contain from about 65 to about 95 weight percent polycarbonate, from about 5 to about 30 weight percent ABS graft copolymer resin, and from about 1 to about 20 weight percent polymethylmethacrylate.

In the following examples, several samples were prepared by blending: (1) a bisphenol A polycarbonate, (2) a high rubber (50 weight % polybutadiene) ABS graft copolymer (acrylonitrile: 12 weight %; butadiene: 50 weight %; styrene: 38 weight %) and (3) poly methylmethacrylate). Key physical properties of these samples were then compared with controls in which the PMMA was replaced with an equivalent amount of styrene-acrylonitrile (SAN) copolymer.

EXAMPLE 1

A blend was prepared by melt mixing the following polymeric components on a Werner Pfleider twin screw extruder (26 MM): 68 wt % bisphenol A polycarbonate (Lexan 105—General Electric Company), 15 wt % high rubber graft ABS (acrylonitrile: 12 weight %; butadiene: 50 weight %; styrene: 38 weight %) and 17 wt % poly(methylmethacrylate)—Rohm & Haas V920.

This blend was molded into one set of test plaques using a double grated tensile bar mold that provided a weld line at the center of the test bar and another set of test plaques with a single grated mold providing no weld line.

EXAMPLE 2

Example 1 was repeated to make a blend in which styrene-acrylonitrile copolymer (styrene: 75 weight %; acrylonitrile: 25 weight %) was substituted for the PMMA (17 wt %). Table I presents the formulations of Examples 1 and 2.

TABLE I

| COMPONENT | EXAMPLE 1 | EXAMPLE 2 |
|---|---|---|
| PC (Lexan 105) | 68 | 68 |
| ABS (High Rubber Graft) | 15 | 15 |
| PMMA | 17 | — |
| SAN | — | 17 |

EXAMPLES 3-6

Example 1 was repeated using different proportions of the polycarbonate relative to the SAN/PMMA. In each case the amount of SAN substituted for the PMMA was equivalent. Recipes are in parts by weight, not wt %.

TABLE II

|  | Example No. | | | | | |
|---|---|---|---|---|---|---|
|  | 1 | 2 | 3 | 4 | 5 | 6 |
| PC | 68 | 68 | 78 | 78 | 73 | 73 |
| ABS | 15 | 15 | 15 | 15 | 15 | 15 |
| SAN | — | 17 | 5 | — | 12 | — |
| PMMA | 17 | — | — | 5 | — | 12 |
| Weld Line Edge Impact, Unnotched, ft-lb/in | 6.7 | 2.3 | 5.4 | 9.9 | 2.9 | 9.1 |
| Weld Line Flat Side Impact, Unnotched, ft.-lb./in. |  |  |  |  | 1.1 | 5.1 |
| Tensile Strength at Weld, psi | 7550 | 6606 |  |  |  |  |
| Tensile Strength No weld, psi | 7900 | 8050 |  |  |  |  |
| Percent Retention of Tensile Strength for Samples with Weldline | 96% | 82% |  |  |  |  |

The impact strength tests were with a modified Izod test (ASTM D-256). Normally, a notch is cut into the edge of the test bar; but in the case of the samples having the weld line, no notches were provided. In effect, the weakness of the weld line was equivalent to that created by a notch.

EXAMPLES 7 and 8

The prior art contains numerous references to graft polymers being prepared by grafting acrylonitrile and styrene onto an acrylic rubber backbone or rubbery interpolymers. One such composition is a terpolymer of methyl methacrylate, acrylonitrile and styrene (MMA-SAN). In order to demonstrate that the PMMA behaves differently than the MMASAN, compositions were prepared in the same manner as in Example 1, but the MMA was provided in the form of MMASA.N in an amount approximately equivalent to the MMA units in the PMMA. An experimental MMASAN was provided in the form of a recipe which contained 70 wt % methyl methacrylate, 15 wt % styrene and 15 wt. % acrylonitrile. Example 7 contained MMASAN furnishing 17% MMA units and Example 8 contained PMMA with the equivalent 17% MMA units. The weldline strength is set forth in Table III below.

TABLE III

|  | Example No. | |
|---|---|---|
|  | 7 | 8 |
| Composition | (PC/MMASAN/ABS) | ((PC/PMMA/ABS) |
| Weld Line strength, Unnotched, ft.-lb./in. | 3.0 | 5.7 |

EXAMPLES 9-12

Additional samples were prepared varying the amount of SAN substituted for the PMMA from 0 to 17% (total addition to a recipe containing 68 wt. % PC and 15 wt. % ABS). The ratios of PMMA/SAN are expressed in ranges from 100/0 to 0/100 in four increments in Table IV together with the measured weld line strength of each composition.

TABLE IV

|  | Example No. | | | |
|---|---|---|---|---|
|  | 9 | 10 | 11 | 12 |
| PMMA/SAN ratio | (100/0) | (60/40) | (40/60) | (0/100) |
| Weld Line Strength, Unnotched, Ft. Lb/In. | 5.7 | 3.2 | 2.9 | 2.2 |

While the mechanism by which the weld line strength is improved is not conclusively understood, it is believed that the morphology of the PC/ABS blend is modified by promoting a more uniform dispersion of phases in the composition. Conventional PC/ABS tends to have a layered structure in which large domains of SAN with polybutadiene exist. This perhaps is caused by miscibility limitations between the SAN and PC phases. Ideally, what is needed is a polymer which is more compatible with polycarbonate than SAN and is less miscible than SAN with the grafted rubber. PMMA appears to satisfy all such requirements.

This invention has been described in connection with certain specific embodiments, but it should be construed as broadly as the appended claims will permit.

What is claimed is:

1. A thermoplastic polymer blend composition consisting essentially of (a) from about 5 to about 30 weight percent of a graft copolymer component comprising from about 50 to about 60 weight percent of a diene rubber substrate and a grafted portion formed from a monovinyl aromatic monomer and an alkenyl nitrile monomer, the graft copolymer containing less than about 5 weight percent methyl methacrylate, (b) from about 12 to about 20 weight percent of a polymethylmethacrylate homopolymer or a copolymer thereof with $C_1$-$C_4$ alkyl acrylates, and (c) from about 65 to about 95 weight percent of a polycarbonate component.

2. A thermoplastic polymer blend composition according to claim 1, comprising the polymethylmethacrylate homopolymer.

3. A thermoplastic polymer blend composition according to claim 1, comprising a copolymer of methyl methacrylate and ethyl acrylate.

4. A composition as defined in claim 1, wherein said rubber substrate consists essentially of polybutadiene.

5. A composition as defined in claim 1, wherein said monovinyl aromatic monomer in component (A) is selected from the group consisting of styrene, α-methylstyrene and para-methylstyrene, and mixtures of two or more of said monomers.

6. A composition as defined in claim 1, wherein said alkenyl nitrile in component (A) is selected from the group consisting of acrylonitrile and methacrylonitrile.

7. A composition as defined in claim 1, wherein the polycarbonate component is a bisphenol A polycarbonate.

* * * * *